United States Patent Office 2,930,116
Patented Mar. 29, 1960

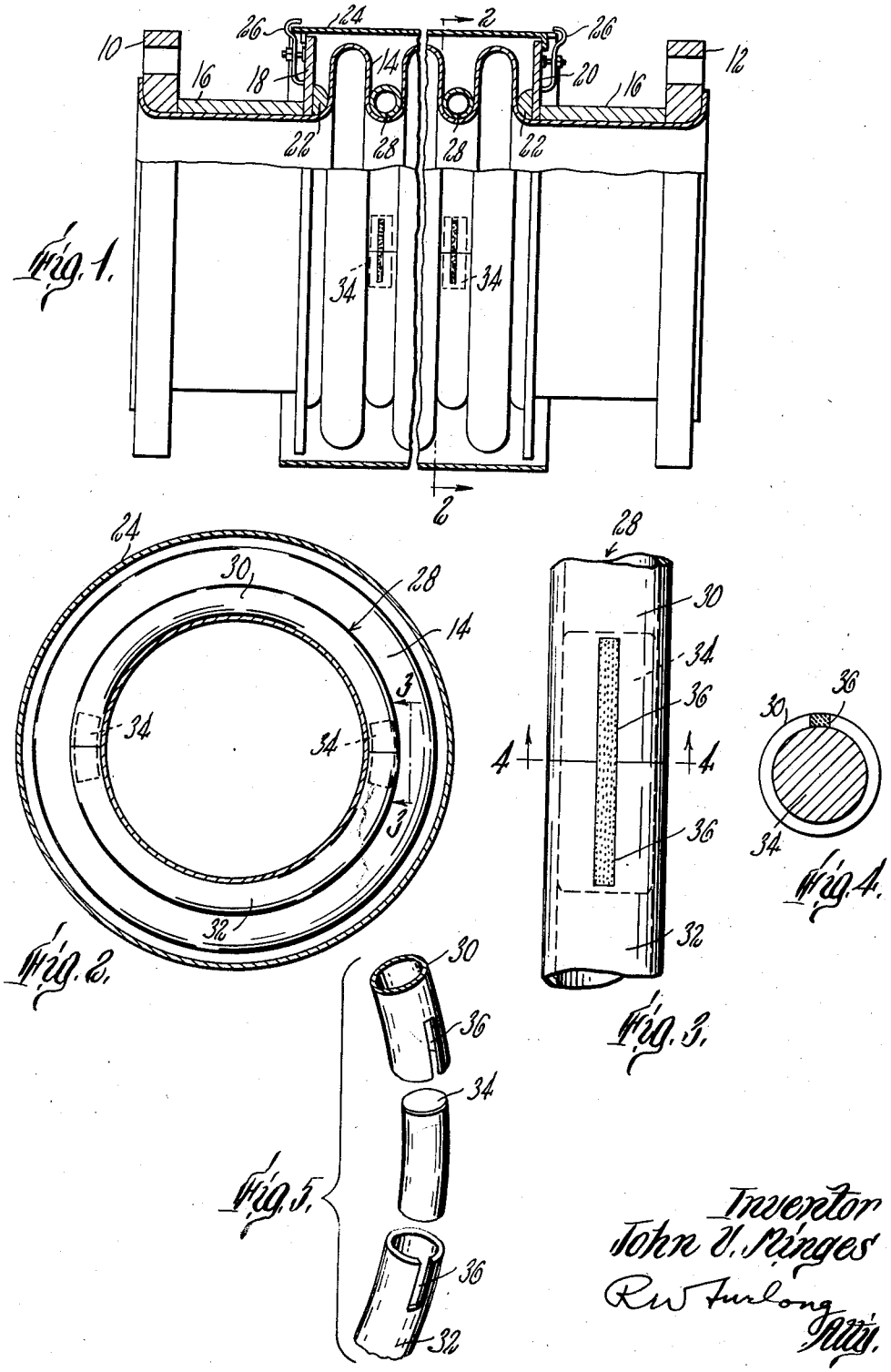

2,930,116

REINFORCING RING FOR EXPANSION JOINT AND METHOD OF MAKING SAME

John V. Minges, Marblehead, Mass., assignor to Badger Manufacturing Company, Cambridge, Mass., a corporation of Massachusetts Application December 6, 1955, Serial No. 551,344

2 Claims. (Cl. 29—454)

This invention relates to a reinforcing or control ring for a bellows-type expansion joint and to a method of making the same.

Expansion joints for pipe lines conventionally comprise a generally cylindrical bellows member in the form of a tube having circumferential corrugations to permit axial extension and compression thereof. In order to prevent radial expansion or distortion of the bellows member, a reinforcing or control member is mounted externally of the bellows to engage it between adjacent corrugations and limit or prevent radial expansion. In the past these control members have generally been metal castings which not only increase the weight of the assembled expansion joint, but are difficult and expensive to fabricate to the desired close tolerances.

In the copending application of Warren H. Reid, Jr., Serial No. 548,978 filed November 25, 1955, now Patent No. 2,886,885, there is described an improved expansion joint having lightweight reinforcing or control rings which may readily be fabricated from steel pipe or tubing by securing curved lengths of such tubing together in end-to-end abutting relation. The present invention is directed to an improvement in such reinforcing or control rings.

One object of the invention is to provide a novel construction for fastening together the abutting ends of curved tubular elements to form a control ring.

Another object is to provide a simple and inexpensive method for fabricating such a control ring.

Other and further objects will be apparent from the drawing and from the description which follows.

In the drawing:

Fig. 1 is a view in longitudinal section of an expansion joint embodying the present invention;

Fig. 2 is a view in cross section taken along line 2—2 of Fig. 1;

Fig. 3 is a view taken along the line 3—3 of Fig. 2;

Fig. 4 is a sectional view taken along the line 4—4 of Fig. 3; and

Fig. 5 is an exploded view partly broken away showing the several parts of the reinforcing ring in position for assembly.

As shown in Fig. 1 the expansion joint comprises a pair of flanges 10, 12 provided with suitable bolt holes for mounting the expansion joint in place between adjacent ends of a pipe line or the like. The bellows expansion member 14, comprising a generally cylindrical bellows of ductile metal formed from a tubular member having circumferential corrugations, has its ends turned over the outer faces of mounting flanges 10 and 12. Spacing sleeves 16, 16 extend between mounting flanges 10, 12 and end covers 18, 20 respectively. Disposed against the inner faces of end covers 18, 20 are supporting members 22, 22, each of which is of semicircular cross-sectional configuration with its flat side adjacent the inner face of the respective end cover. Supporting members 22, 22 are in the form of closed rings which extend completely around bellows member 14 and engage the end convolutions of the bellows. Mounting flanges 10, 12, sleeves 16, 16, end covers 18, 20, and supporting members 22, 22 are held in the desired assembled relation between the respective end convolution of the bellows and the turned-over margin of expansion member 14 at the outer face of the respective mounting flange. A generally cylindrical dust cover 24 is provided with turned-down flanges at each end which loosely engage end covers 18, 20, permitting axial compression and extension of bellows member 14 as well as limited lateral movement of each end of the bellows member with respect to the other. In order to prevent distortion of the expansion joint during storage and shipment prior to installation a removable shipping bracket 26, 26 is bolted to each of end covers 18, 20 in a position to engage the margin of dust cover 24. With brackets 26, 26 in place, the expansion joint is held in rigidly fixed position. Brackets 26, 26 are removed in order to place the joint in condition for operation.

Mounted externally of bellows member 14 and seated between adjacent corrugations thereof are reinforcing or control rings 28, 28. These rings, as best seen in Fig. 2, are formed from a pair of arcuate tubular members 30, 32 of uniform circular cross-sectional configuration throughout their extent which mate in end-to-end relation to form a ring. In order to secure together the mating ends of tubular members 30, 32 there are provided a pair of core elements 34, 34 each of which has a diameter slightly less than the bore or inner diameter of tubular members 30, 32 and extends across the joint between the mating ends of these tubular members substantially filling the bore of the tubular members adjacent their abutting ends. The tubular members 30, 32 and core element 34 may be formed of any suitable material, preferably steel or stainless steel. Adjacent each mating end of tubular members 30, 32 there is provided an aperture through the wall of the tubular member at the outer face of the ring, preferably in the form of a slot 36 which extends inwardly from the end of the tubular member axially thereof and is so positioned as to mate with a corresponding slot in the adjacent end of the other tubular member. It will be understood, of course, that the apertures may have other forms or shapes, but it is preferred that the width of the aperture be less than one-half the diameter of the tubular member and that the area of the aperture be approximately the same as, i.e., from 90% to 200% of, the cross-sectional area of the metallic wall of the tubular members. Core element 34 completely underlies both apertures 36, 36 adjacent the abutting ends and serves as a guide to maintain the closely abutting ends of the tubular members 30, 32 in mating relation. Core element 34 is fusion welded to the wall of each of tubular members 30, 32 through slots 36, 36 as shown in Fig. 4, thus permanently joining the ends of tubular members 30, 32. It will be understood that although the preferred embodiment shown in the drawing comprises a pair of mating tubular members, the ring may be made from a single tubular member bent into circular form with its ends secured in abutting relation as described above, or three or more such tubular members may be joined to form a ring. When two tubular members are employed to form a ring, the two joints preferably are disposed 180° apart.

In assembling the control rings of the present invention, each mating pair of arcuate tubular members 30, 32 may be assembled with core elements 34, 34 in place in the bore thereof about bellows member 14, following which core elements 34, 34 may be quickly and easily welded to the walls of tubular members 30, 32 through slots 36, 36, two passes usually sufficing in the case of tubular members which have an outside diameter of about 1 inch with each slot having a width of about 3/16 inch and a length of 2½ inches. Inasmuch as the area of each slot is approximately equal to the cross-sectional metallic area of the tubular members, the strength of each joint is approximately equal to the strength of the tubing itself. In order to provide a close fit of the mating ends of tubular members 30, 32 it is desirable to have core element 34 curved on the same radius as each of tubular members 30, 32, and to machine each of the abutting ends of the tubular members.

The reinforcing rings of the present invention may be applied to a preformed bellows expansion member or they may be employed as forming dies during the formation of the bellows and left permanently in place as reinforcing or control rings as described and claimed in the aforesaid Reid application Serial No. 548,978.

Although specific embodiments of the invention have been described herein, it is not intended to limit the invention solely thereto but to include all of the obvious variations and modifications within the spirit and scope of the appended claims.

I claim:

1. The method of making an expansion joint which comprises providing a generally cylindrical bellows expansion member having a plurality of circumferential corrugations adapted for axial extension and compression, providing a pair of arcuate tubular metallic members which mate in end-to-end relation to form a ring, each said member having an aperture through its wall at the outer face of said ring adjacent each end, assembling said tubular members in mating relation about said expansion member with a smooth-faced imperforate metallic core element disposed within the bore of said members and extending across each joint between the mating ends and beneath said apertures, said assembly being seated between adjacent corrugations externally of said expansion member and said apertures being spaced from the walls of said adjacent corrugations, and fusion welding each said core element to the walls of said tubular members through said apertures.

2. The method of making an expansion joint which comprises providing a generally cylindrical bellows expansion member adapted for axial extension and compression, providing a pair of arcuate hollow tubular members which mate with each other in end-to-end relationship to form a ring, each said tubular member having a slot through its wall at the external side of the ring extending generally circumferentially of said ring from each end of each said tubular member, the width of each slot being less that one-half the diameter of said tubular member and the area of each slot being from 90% to 200% of the cross-sectional area of the metal in said tubular member, assembling said tubular members about said expansion member in abutting end-to-end relationship, together with a smooth-faced imperforate metallic core element disposed within said tubular members extending across each joint between abutting ends and completely underlying said slots, while simultaneously with said assembly seating said tubular members between a pair of adjacent corrugations externally of said expansion member to form a smooth-surfaced ring of uniform circular cross-sectional configuration throughout its extent, and fusion welding each said core member to the wall of each said tubular member along each slot to form a unitary reinforcing ring.

References Cited in the file of this patent

UNITED STATES PATENTS

| | | |
|---|---|---|
| 840,864 | Peterson | Jan. 8, 1907 |
| 1,268,980 | Krumholz | June 11, 1918 |
| 1,293,871 | Murray | Feb. 11, 1919 |
| 1,344,221 | Burns | June 22, 1920 |
| 1,345,971 | Star | July 6, 1920 |
| 1,637,750 | Kilham | Aug. 2, 1927 |
| 1,700,319 | Kjekstad | Jan. 22, 1929 |
| 1,853,549 | Clark | Apr. 12, 1932 |
| 1,878,829 | Crouch | Sept. 20, 1932 |
| 1,912,993 | Murray, Jr. | June 6, 1933 |
| 2,489,844 | Zallea et al. | Nov. 29, 1949 |
| 2,886,885 | Reid | May 19, 1959 |

FOREIGN PATENTS

| | | |
|---|---|---|
| 708,598 | France | May 4, 1931 |

UNITED STATES PATENT OFFICE
CERTIFICATE OF CORRECTION

Patent No. 2,930,116                                      March 29, 1960

John V. Minges

It is hereby certified that error appears in the printed specification of the above numbered patent requiring correction and that the said Letters Patent should read as corrected below.

Column 1, line 30, beginning with "In the copending" strike out the entire paragraph, ending with "or control rings." in line 37, same column; column 3, line 14, after "rings" insert a period; same line 14, and line 15, strike out "as described and claimed in the aforesaid Reid application Serial No. 548,978."

Signed and sealed this 20th day of September 1960.

(SEAL)
Attest:

KARL H. AXLINE                                               ROBERT C. WATSON
Attesting Officer                                           Commissioner of Patents